Patented Mar. 1, 1949

2,462,938

UNITED STATES PATENT OFFICE 2,462,938

OXIDATION REACTION

Joseph E. Bludworth and Paul C. Pearson, Jr., Corpus Christi, Tex., assignors to Celanese Corporation of America, a corporation of Delaware No Drawing. Application July 3, 1945, Serial No. 603,108

6 Claims. (Cl. 260—342.6)

This invention relates to an improved process for the production of maleic acid and maleic anhydride by reactions involving the oxidation of crotonaldehyde.

An object of this invention is the provision of an improved process for the catalytic vapor phase oxidation of crotonaldehyde whereby maleic acid and maleic anhydride are obtained in improved yield and with a minimum formation of decomposition and polymerization products.

Other objects of this invention will appear from the following detailed description.

As is known, maleic acid and maleic anhydride are obtained by the catalytic vapor phase oxidation of crotonaldehyde employing air as the oxidizing agent. To be commercially feasible the reaction must be conducted under such conditions that complete oxidation or decomposition of the crotonaldehyde to carbon dioxide and water is held to a minimum. Such decomposition has been found to be decreased appreciably by effecting the oxidation at lower temperatures or by employing a large ratio of air to crotonaldehyde. By employing suitable calculations involving a material balance and a measurement of the carbon dioxide formed, the optimum air ratio and temperature conditions may readily be determined. While such undesirable decomposition to carbon dioxide and water has been found to be minimized by effecting oxidation under such optimum conditions, the degree of crotonaldehyde oxidation which may be effected per pass through the catalytic reaction zone is also decreased. Accordingly, any modification in prior oxidation processes whereby yields may be substantially increased and the degree of the decomposition to carbon dioxide and water decreased while maintaining a high conversion rate is of value.

We have now found that crotonaldehyde may be catalytically oxidized with air in the vapor phase to maleic acid and maleic anhydride at lower temperatures and in substantially increased yield with minimum decomposition if an inert diluent such as steam is incorporated with the air and crotonaldehyde during passage of said reactants over the catalyst in the heated reaction zone. By carrying out the oxidation in the presence of steam as a diluent we have found that the necessary time of contact with the catalyst to effect the desired oxidation is substantially reduced thus enabling a more rapid production of the desired oxidation products.

In carrying out the oxidation reaction in accordance with our novel process, crotonaldehyde is mixed with a predetermined quantity of air, the mixture then diluted with the desired quantity of steam and the latter mixture passed over an oxidation catalyst heated to the desired oxidation temperature. The oxidation reaction products issuing from the catalytic reaction zone are condensed and the products formed are then separated and purified in any convenient manner.

The air employed for forming the mixture of air and crotonaldehyde is passed prior to steam dilution through an orifice meter where the rate of flow is adjusted. A measured volume of air is then passed through a carburetor where it effects the vaporization of a measured quantity of crotonaldehyde which is fed to the carburetor at a controlled and uniform rate. The most desirable results are obtained where the crotonaldehyde and air ratio in the vapor mixture is adjusted so that from about 30 to 85 parts by weight of air are present for each part by weight of crotonaldehyde in the mixture. The crotonaldehyde and air mixture is then preheated by being passed through a preheater where the vapor mixture is raised to a temperature of 55 to 105° C. to insure complete vaporization before dilution with steam is effected. While the amount of steam present in the mixture may vary over wide limits, the most desirable results are obtained during oxidation by diluting the crotonaldehyde and air mixture with from 3 to 25 parts by weight of steam based on the weight of the crotonaldehyde present in the mixture. The mixture of air, crotonaldehyde and steam is then led into the reaction chamber containing the oxidation catalyst, which is maintained at a temperature of 340 to 425° C. The vapors are passed through the heated reaction chamber and over the heated catalyst at a velocity of from 2 to 5 feet per second so that they will be in contact with the oxidation catalyst for from 0.1 to 0.7 second. The vaporized mixture of oxidation products issuing from the reaction zone are passed to a liquid drain-off trap, through a condenser, a water-filled quench trap and a scrubbing tower, in series. The uncondensable vent gases are passed to a gas analyzer where they are subjected to periodic analysis for determination of the carbon dioxide formed and to determine the amount of unreacted crotonaldehyde. The maleic acid and maleic anhydride which are produced are recovered in the form of an aqueous solution of maleic acid and may be separated in purified form by a suitable recovery process.

We have found that while any suitable oxidation catalyst is satisfactory, the most desirable results are obtained employing an oxidation catalyst comprising a mixture of vanadium pentoxide and molybdenum trioxide in a ratio of about 1 to 6 parts by weight of vanadium pentoxide to each part by weight of molybdenum trioxide present, the mixture also containing a small proportion of phosphorus pentoxide and supported on an aluminum base. The aluminum base supporting the catalyst may be of any convenient shape but most advantageously we employ aluminum in the form of wire spirals ⅛ inch in diameter and about ¼ to 1 inch in length averaging about 7 turns per inch. The catalyst may be prepared most conveniently by mixing an aqueous solution of ammonium vanadate, ammonium molybdate and diammonium phosphate with the aluminum spirals while they are heated to a temperature of about 200° C. The soluble ammonium salts decompose to the insoluble oxides and coat the spirals with a very thin layer of catalyst. The catalyst may be further activated by heating to 425 to 550° C. in a stream of air for about 8 to 10 hours or more. Preferably, the catalyst should contain about 30 to 32% by weight of vanadium pentoxide, 7 to 9% of molybdenum trioxide and 0.3 to 5% of phosphorus pentoxide, the remainder comprising the aluminum base upon which the catalyst is supported.

By carrying out the oxidation of crotonaldehyde in accordance with our novel process, conversions of 42% or more, with over 85% of the oxidized crotonaldehyde being converted to maleic acid and maleic anhydride, may be obtained. The temperatures at which our novel catalytic oxidation process may be effectively carried out are substantially lower than heretofore considered capable of effective operation. In addition, the time of contact between the reactants and the catalyst is substantially shortened so that decomposition of the crotonaldehyde to undesirable oxidation products is maintained at a minimum.

In order further to illustrate our invention, but without being limited thereto, the following examples are given:

Example I

A current of air is passed through a carburetor at a rate of 600 parts by weight per hour to which is simultaneously fed crotonaldehyde at the rate of 12 parts by weight per hour. The crotonaldehyde and air mixture after leaving the carburetor in preheated to a temperature of 90° C. to insure complete vaporization and is then combined with steam in a ratio of 3 parts by weight of steam for each part by weight of crotonaldehyde present in the mixture of crotonaldehyde and air. The vapor mixture thus obtained is then passed over an oxidation catalyst contained in a stainless steel reactor. The oxidation catalyst comprises 31.5% by weight of vanadium pentoxide, 7.9% by weight of molybdenum trioxide, 0.4% by weight of phosphorus pentoxide and 60.2% by weight of aluminum, the aluminum being coated with said oxide mixture. The catalyst is held at a temperature of 350° C. by suitable heating means. The vapors are caused to traverse the reaction zone at a velocity of a little over 2 feet per second, the reaction zone being of such length that the vapors are in contact with the catalyst for approximately 0.24 second. To recover the oxidation products formed, the reaction vapors are passed to a liquid drain-off trap, and then in series through a condenser cooled with water at a temperature of 35° C., a water filled quench trap immersed in ice water and finally through a scrubbing tower in which water cooled to 45° C. is recycled. Any uncondensed gases are vented to a gas analyzer where they are periodically analyzed for carbon dioxide and escaping crotonaldehyde. The maleic acid and maleic anhydride formed are obtained as an aqueous solution solution of maleic acid from which they are recovered by a suitable separation process. For example, the water may be removed by vacuum evaporation and any maleic acid then dehydrated to maleic anhydride. This is done by maintaining the temperature of the undehydrated product at over 100° C. while keeping the product under high vacuum. Further purification of the maleic anhydride may be effected by a sublimation of the maleic anhydride. A conversion of 42% of the crotonaldehyde is effected and of this 83.6% is converted to maleic acid. Relatively little decomposition is observed as determined by the relatively small quantity of carbon dioxide that forms during the reaction.

Example II

A current of air is passed through a carburetor at a rate of 840 parts by weight per hour to which is simultaneously fed 15 parts by weight per hour of crotonaldehyde. The crotonaldehyde and air mixture formed is preheated on leaving the carburetor to a temperature of 60° C. to insure complete vaporization and is then combined with steam in a ration of 25 parts by weight of steam for each part by weight of crotonaldehyde present. The vapor mixture thus produced is then entered into a stainless steel reactor containing an oxidation catalyst of the same type and composition as that employed in Example I. The catalyst is held at a temperature of 370° C. by suitable heating means. The vapor mixture undergoing oxidation traverses the reaction zone at a velocity of a little over 4.4 feet per second the reaction zone being of such length that the vapors are in contact with the catalyst for approximately 0.29 second. The oxidation products formed are absorbed in water and are then separated and purified, in the manner described in Example I. If desired the maleic acid may be steam distilled from the reaction product, extracted from the water with ethyl acetate and the maleic acid crystallized from the ethyl acetate by vacuum evaporation. The remaining ethyl acetate may be evaporated completely, xylene added and the water present removed by azeotropic distillation. After the xylene is removed the maleic acid may be converted to pure maleic anhydride by distillation and sublimation. A conversion of 45.9% with a yield of 60% of maleic acid is obtained with no substantial formation of carbon dioxide.

Example III

A current of air is passed through a carburetor at a rate of 840 parts by weight per hour to which is simultaneously fed 11.8 parts by weight of crotonaldehyde. The crotonaldehyde and air mixture formed is preheated to 70° C. to insure complete vaporization of the crotonaldehyde and is then combined with steam in a ratio of 3 parts by weight of steam for each part by weight of crotonaldehyde present. The vapor mixture obtained is entered into a stainless steel reactor containing an oxidation catalyst comprising vanadium pentoxide, molybdenum trioxide and phosphorus pentoxide on aluminum spirals prepared in a manner described below. The catalyst is held at an average temperature of about 425° C., the vapor mixture traversing the reaction zone at a velocity of 2.9 feet per second, the reaction zone being of such length that the vapors are in contact with the catalyst for 0.28 second. The oxidation products formed are absorbed in water, steam distilled and the maleic acid extracted from the distillate with ethyl acetate. The maleic acid is separated and purified by crystallization from the ethyl acetate, any water then removed by azeotropic distillation, as described in Example II, and the product then converted to pure maleic anhydride. No carbon dioxide at all is detected in the vent gases when effecting oxidation under these conditions. The conversion obtained is 36.3% with a yield of 86.3% of maleic acid.

The catalyst is prepared by passing a solution of 34 parts by weight of ammonium vanadate, 8.2 parts of ammonium molybdate and 0.5 part of diammonium phosphate in 350 parts by weight of distilled water, to which is added 6.0 parts by weight of concentrated hydrochloric acid, over 20 parts by weight of aluminum spirals in a vertical tube and heated to 200 to 235° C. while air is passed through the tube. The solution is mixed with the aluminum spirals gradually. When all of the solution has been added the catalyst is taken from the tube, cleaned of loose particles and repacked in the tube. The catalyst is then activated by heating at 480 to 550° C. for 8 to 10 hours in an air stream and is ready for use.

Unreacted crotonaldehyde may be recycled in the process further to increase the yields obtained. Preferably, the unreacted crotonaldehyde which is usually obtained as an aqueous solution containing from about 6 to 10% by weight of crotonaldehyde is recycled by being fed to and vaporized in the steam generator wherein the diluent stream is formed.

It is to be understood that the foregoing detailed description is given merely by way of illustration and that many variations may be made therein without departing from the spirit of our invention.

Having described our invention, what we desire to secure by Letters Patent is:

1. Process for the catalytic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde and passing the diluted mixture over an oxidation catalyst at a temperature of 340 to 425° C.

2. Process for the catalytic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde and passing the diluted mixture over an oxidation catalyst comprising a mixture of vanadium pentoxide, molybdenum trioxide and phosphorous pentoxide at a temperature of 340 to 425° C.

3. Process for the catalytic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde, passing the diluted mixture over an oxidation catalyst comprising a mixture of vanadium pentoxide, molybdenum trioxide and phosphorous pentoxide at a temperature of 340 to 425° C. the metal oxides being present in a ratio of 1 to 6 parts by weight of vanadium pentoxide to each part by weight of molybdenum trioxide present, separating the unreacted crotonaldehyde in aqueous solution, vaporizing said aqueous solution of crotonaldehyde, and introducing the resultant vapors of crotonaldehyde and steam into the air-crotonaldehyde mixture before the latter is passed over the oxidation catalyst.

4. Process for the catalytic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde and passing the diluted mixture over an oxidation catalyst comprising a mixture of vanadium pentoxide, molybdenum trioxide and phosphorous pentoxide on an inert base at a temperature of 340 to 425° C. the metal oxides being present in a ratio of 1 to 6 parts by weight of vanadium pentoxide to each part by weight of molybednum trioxide present.

5. Process for the catalystic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde, passing the diluted mixture over an oxidation catalyst comprising a mixture of vanadium pentoxide, molybdenum trioxide and phosphorous pentoxide on an aluminum base at a temperature of 340 to 425° C. the metal oxides being present in a ratio of 1 to 6 parts by weight of vanadium pentoxide to each part by weight of molybdenum trioxide present, separating the unreacted crotonaldehyde in aqueuous solution, vaporizing said aqueuous solution of crotonaldehyde, and introducing the resultant vapors of crotonaldehyde and steam into the air-crotonaldehyde mixture before the latter is passed over the oxidation catalyst.

6. Process for the catalytic vapor phase oxidation of crotonaldehyde to maleic acid and maleic anhydride, which comprises forming a vapor mixture of air and crotonaldehyde in a ratio of 30 to 85 parts by weight of air per part of crotonaldehyde, diluting the mixture with 3 to 25 parts by weight of steam to the weight of the crotonaldehyde and passing the diluted mixture over an oxidation catalyst comprising a mixture of vanadium pentoxide, molybdenum trioxide and phosphorus pentoxide on a spirally wound aluminum wire base at a temperature of 340 to 425° C. the metal oxides being present in a ratio of about 4 parts by weight of vanadium pentoxide to each part by weight of molybdenum trioxide present.

JOSEPH E. BLUDWORTH.
PAUL C. PEARSON, Jr.

REFERENCES CITED

The following references are of record in the file of this patent:

UNITED STATES PATENTS

| Number | Name | Date |
| --- | --- | --- |
| 1,880,901 | Drossbach | Oct. 4, 1932 |
| 1,895,522 | Punnett | Jan. 31, 1933 |
| 1,956,482 | Zumstein | Apr. 24, 1934 |
| 2,215,070 | Miller | Sept. 17, 1940 |
| 2,260,409 | Slotterback et al. | Oct. 28, 1941 |
| 2,288,769 | Alleman et al. | Apr. 7, 1942 |
| 2,415,531 | Porter | Feb. 11, 1947 |